United States Patent
Feldewerth et al.

(10) Patent No.: US 7,066,169 B2
(45) Date of Patent: Jun. 27, 2006

(54) GRILLING SURFACE FOR GAS GRILL PROVIDING FLAME CONTROL AND GREASE DIVERSION

(76) Inventors: Ronald Feldewerth, 1906 Arrowhead La., Godfrey, IL (US) 62035; Ron Smith, 624 Wodland Ct., Troy, IL (US) 62294

( * ) Notice: Subject to any disclaimer, the term of this patent is extended or adjusted under 35 U.S.C. 154(b) by 754 days.

(21) Appl. No.: 09/799,275

(22) Filed: Mar. 5, 2001

(65) Prior Publication Data
US 2001/0037802 A1    Nov. 8, 2001

Related U.S. Application Data

(60) Provisional application No. 60/188,617, filed on Mar. 13, 2000.

(51) Int. Cl.
*F24C 3/00* (2006.01)
*A47J 37/00* (2006.01)

(52) U.S. Cl. .................. 126/41 R; 126/25 R; 99/446; 99/450

(58) Field of Classification Search ............. 126/41 R, 126/25 R, 51, 39 J, 39 D; 99/444, 445, 446, 99/447, 450, 400, 425
See application file for complete search history.

(56) References Cited

U.S. PATENT DOCUMENTS

| | | | | |
|---|---|---|---|---|
| 4,351,313 A | * | 9/1982 | Kern | 126/39 J |
| 4,535,753 A | | 8/1985 | Zayauskas | 126/274 |
| 4,586,483 A | | 5/1986 | Perez | 126/41 R |
| 4,630,593 A | * | 12/1986 | Gremillion | 126/41 R |
| 4,979,440 A | * | 12/1990 | Latour et al. | 126/25 R |
| 5,033,365 A | * | 7/1991 | Rao et al. | 99/400 |
| 5,111,803 A | * | 5/1992 | Barker et al. | 126/41 R |
| 5,121,738 A | * | 6/1992 | Harris | 126/25 R |
| 5,363,751 A | * | 11/1994 | Prestigiacomo | 99/444 |
| 5,445,066 A | | 8/1995 | Rosset | 99/146 |
| 5,566,607 A | | 10/1996 | Schleimer | 99/446 |
| 5,615,666 A | | 4/1997 | Ransom | 126/25 R |
| 5,694,917 A | | 12/1997 | Giebel et al. | 126/41 R |
| 5,735,260 A | * | 4/1998 | Rimback | 126/41 R |
| 5,911,812 A | * | 6/1999 | Stanek et al. | 126/25 R |
| 5,938,425 A | | 8/1999 | Damrath et al. | 431/62 |

FOREIGN PATENT DOCUMENTS

| EP | 0332 228 A | * | 9/1989 |
|---|---|---|---|
| JP | 2000-189793 A | * | 7/2000 |

* cited by examiner

*Primary Examiner*—Josiah C. Cocks
(74) *Attorney, Agent, or Firm*—Paul M Denk (57) ABSTRACT

A grilling surface, and a grease diverter, within a standard gas grill having a cover, base, and a gas burner. The grilling surface is formed of a series of integrally structured inverted and truncated pyramids, or cones, connected together, and having an aperture provided through each pyramid or cone, at its downward edge, to allow for drainage of grease therethrough, but to generally retard the direct access of flame to the food being cooked. A grease diverter, may be positioned below the grilling surface comprising a compound sloping plate, having its apex at the midpoint, and sloping downwardly to its front and back edge to divert grease away from the open flame.

5 Claims, 7 Drawing Sheets

FIG. 9

GRILLING SURFACE FOR GAS GRILL PROVIDING FLAME CONTROL AND GREASE DIVERSION

CROSS-REFERENCE TO RELATED APPLICATIONS'

This application claims priority to provisional application Ser. No. 60/188,617, filed Mar. 13, 2000.

BACKGROUND OF THE INVENTION

This invention relates generally to food grilling apparatus and, more particularly to a device to control the grill flame, prevent hot spots and to divert of excess fats and greases from grilled foods, when cooked upon a grill, and the like, away from direct contact with the cooking flame.

A large variety of devices have been constructed for either completely shielding the cooking food, as upon the surface of a grill, from the flame, and even in the past, various types of ceramic pads have been formed and which become super heated, through its direct exposure to flame, either from the burning charcoals or the gas flame, and which are interposed between the food being cooked, and the flame, and shield the grilled food and meats from direct contact with the fire. However, it sometimes is desirable to have the foods exposed to a controlled flame for purposes of creating a desired grilled flavor in the foods. Also, it is desirable to have an even cooking surface that reduces hot spots. Therefore, it would be desirable provides means for both controlling the flame and diverting the excess greases that drip from the grilling food, so as not to completely block the grilling food from the flame but retard flare ups and burning or scorching of the food. It also would be desirable to provide some means for regulating the contact of the fire with the grilling food, during usage of a gas or charcoal burning grill.

SUMMARY OF THE INVENTION

This invention relates generally to an accessory for application to a gas grill, and more specifically to a flame controlling device, and which may also include a grease diverter, when the gas grill or charcoal grill is being used. The device is designed to create a more even cooking surface and reduce hot spots.

This device can be used as the actual grilling surface, or it can be affixed below the normal grilling surface found on most gas grills and interposed between the grilling surface and the heat or flame source. When used as the actual grilling surface, the products being grilled will be placed directly upon the surface. When the device is not being used as the grilling surface, the products being grilled can be placed on the standard wire grill above the heat source found on the gas grills, with this invention affixed or suspended or otherwise positioned below the grilling surface. The function of the device when applied in this manner is also for use with a grease diverter. The general functional application of this invention is to allow the user the enjoyment of the traditional grilling process, while grilling his/her foods, while at the same time preventing grease related fires from erupting, as normally associated with meat drippings, as well known in the art, and also to provide for a more uniform dispersor of the cooking heat.

The construction of this device is as follows: The device has a top surface which and includes a plurality of inverted pyramids, being hollowed on the inside, that allow meat drippings to flow away from the product being grilled. Each inverted pyramid is attached integrally to an adjacent pyramid, thus providing a matrix or plurality of such pyramids in a single plane. Each pyramid has a hole or drain in the lower end, or at its lower tip, to allow drippings to escape. Adjacent sides of each pyramid converge to a pointed crease which angles downward to the drain. The pointed creases function to prevent the fat drippings standing or puddling. The angles of the slope of the walls of the pyramids leading from the top, or the grilling surface, to the bottom of the of the device, is such that the fat drippings from the grilled product will exit quickly, and not allow the fat drippings to accumulate or puddle up, as can be understood.

In an alternate construction, rounded or cone-shaped funnels may be used for the same purpose, connected into a grid pattern, using the same principle as described in the pyramid shaped construction previously defined. The round shapes may also converge together and are interconnected to make a flat grid that results in the top surface. In these the flat areas, additional venting or slots or holes may be used and constructed into the surface. These venting slots or holes are incorporated in the flat areas between the cones throughout the extent of the top surface. The construction of round funnel shapes into a matrix can leave the identified flat areas at the area next to the funnel, and adjoining other common funnels formed into the grilling surface. Whether constructed in the adjoined pyramidal fashion or the cone fashion, the device of the present invention can be used at the grilling surface itself or suspended below a grilling surface and above the heat source to spread heat, control grease flow and retard flames.

A further modification to the construction of this invention is to provide a grease diverter under the aforesaid grilling surface with the grease diverter including flat sloping panels in the direction laterally from the midpoint. The panels have a series of slots formed therein to allow heat or flame to rise through the grease diverter. These specially constructed sloping flat areas spread heat and provide for directional funneling of a substantial amount of the excess grease drippings to drains found in the body of the grill. However, a lesser amount of the grease can exit through slots provided through the sloping flat surfaces.

The device can be constructed from cast metal, formed metal, or stamped metal. Obviously, construction of the invention is not limited to these types of methods, as can be understood. Optional ceramic, porcelain, Teflon or other hardened coatings can be applied to enhance the performance of, but the invention is not limited to any of the identified materials. In fact, it is known that ceramic or molded cement, can be used to perhaps construct this type of invention, and yet provide various funnel like openings, along its molded construction, when forming the grilling surface of this invention.

It is, therefore, the principal object of this invention to provide a molded or formed grilling surface which can function both as a flame control means, in addition to providing a grease diverter, for a gas grill.

Another object of this invention is to provide a grilling surface that can regulate the degree and quantity of flame, and heat, that attains access to the food being grilled, through its intermediate arrangement between the food supporting grilling surface, and the flame generated therebelow.

Another object of this invention is to provide for various shapes to the supplemental grease diverting device, of this invention, and which allows for the controlled flow of any generated grease, away from the food surface, and even when dripped upon the flame, will prevent the direct access of the flame to the food being cooked.

These and other objects may become more apparent to those skilled in the art upon review of the summary of the invention as provided herein, and upon undertaking a study of the description of the preferred embodiment, in view of the drawings.

BRIEF DESCRIPTION OF THE DRAWINGS

In referring to the drawings.

Corresponding reference numerals indicate corresponding structures throughout the various drawings.

DESCRIPTION OF THE PREFERRED EMBODIMENT

Figure 1:
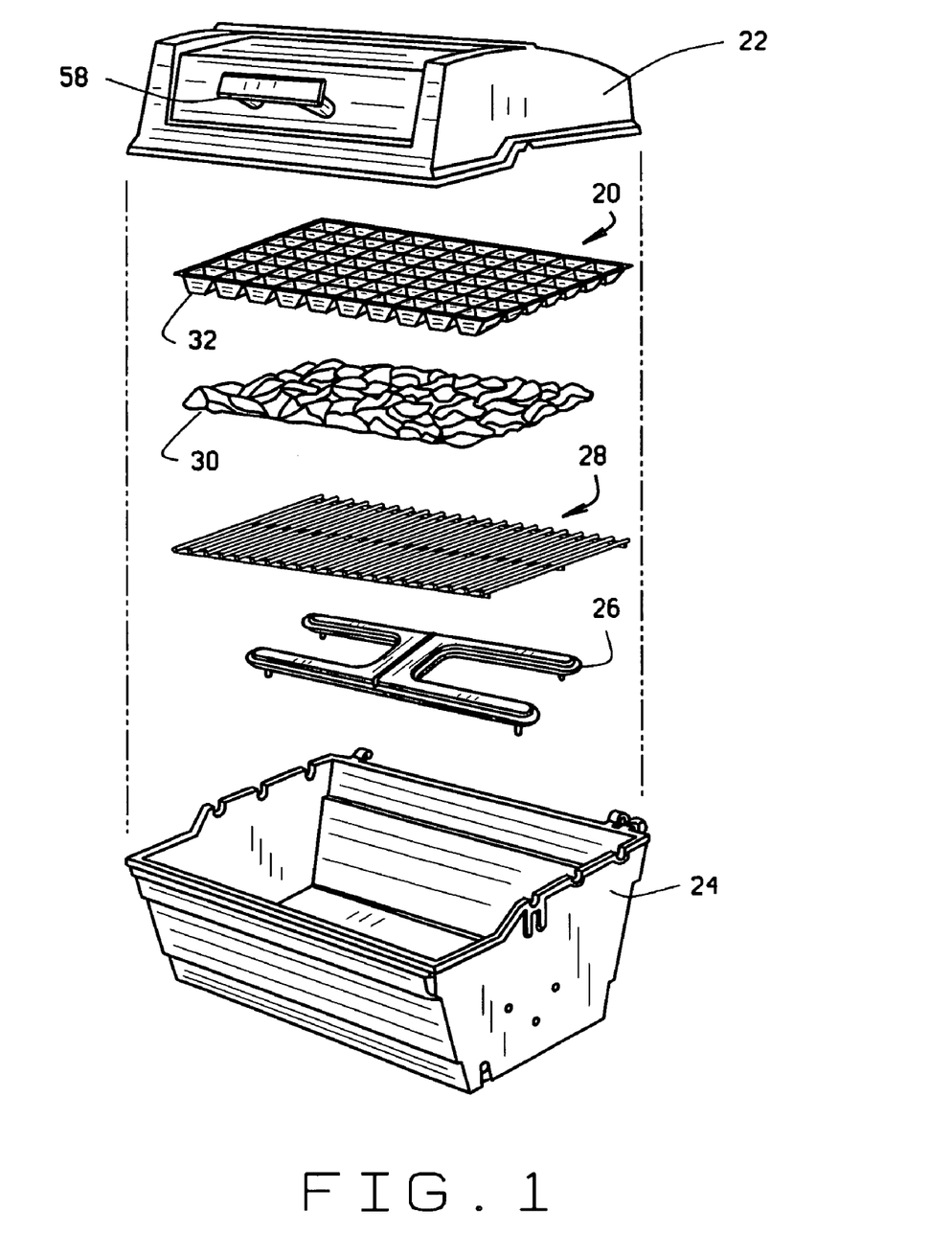
FIG. 1 shows an exploded view of the standard gas grill incorporating the grilling surface of this invention.

In referring to the drawings, and in particular FIG. 1, therein is shown, in exploded view, the gas grill, including the novel flame control, grease diverting grilling surface, indicated generally in the drawings by reference number 20. In FIG. 1, the grilling surface 20 is employed to provide the cooking surface for the placement of the food to be cooked in a typical gas grill. The grill includes the standard hinged lid 22, as usually provided on most gas grills, and which is hingedly connected to a standard base 24, as known. Generally, there is a pedestal or legs (not shown) which support the base 24. The typical grill, in this case a gas grill, includes a gas burner 26 which is operatively connected to a gas source in the form of a propane tank (not shown) or other gas source. A sub grill 28 is positioned over the gas burner 26, usually supported above the burner on detents within the base 24 or other means. In typical gas grills, a layer of lava rock other briquettes 30 is placed on the grate 28 and functions to spread the heat from the burner 26 flame and offer some cover for the burner.

The grilling surface 20 of this invention includes a plurality of integrally connected inverted pyramid like members 32, which normally will be fabricated from durable materials as cast iron or other metal, and into the configuration as best can be seen in FIG. 2A–2D. The grilling surface can be manufactured in any desired size. For example, the inventors have determined that a grilling surface 20 measuring 13.5 inches by 8.5 inches works well in many instances. Furthermore, more than one grilling surface 20 can be employed on larger grills in a side-by-side arrangement.

Figures 2A, 2B:
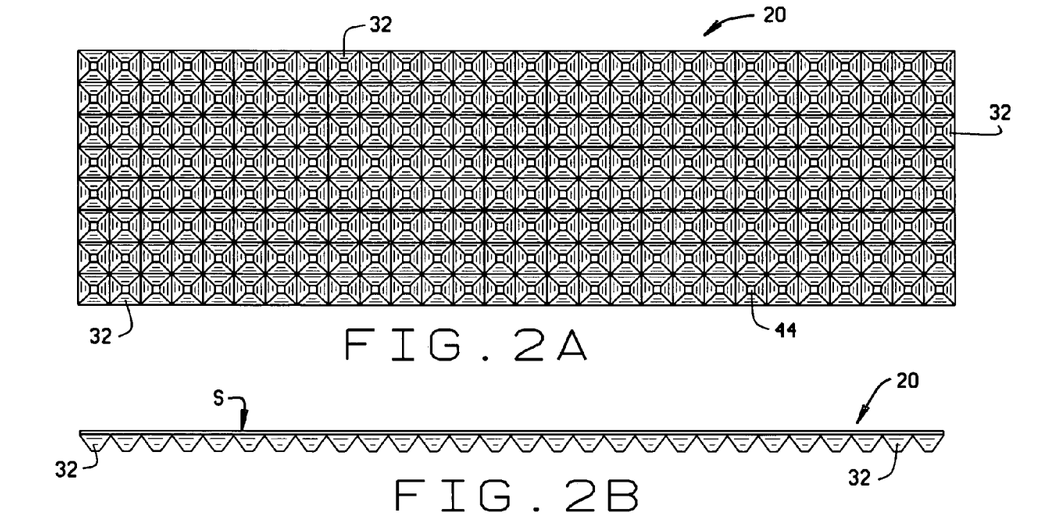
FIG. 2A provides a top view of the inverted pyramidal shape of the grilling surface of this invention.
FIG. 2B provides a side view thereof.
Figure 2C:
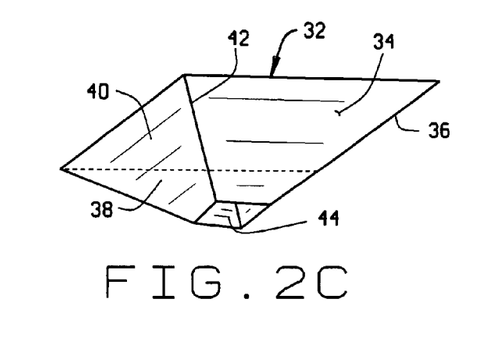
FIG. 2C provides an isometric view of one of the shaped funnels formed into the grilling surface of this invention as disclosed in FIG. 2A.
Figure 2D:
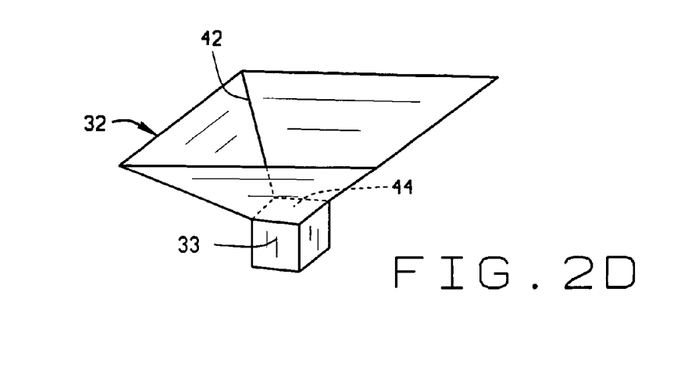
FIG. 2D provides a further modification to the shape of the funnel constructed into the grilling surface of this invention as shown in FIG. 2A.

In the illustrated embodiment, the pyramid members 32 are arranged in rows, as shown, to make a generally rectangular grilling surface. In these figures, there is shown the top view of the grilling surface in FIG. 2A, a front edge view as can be seen in FIG. 2B, and which also disclose a series of interconnected, integrally, series of inverted pyramids 32 whose upper edges are blended into the formation a surface S. These inverted pyramids 32 may be in two styles, one as shown in FIG. 2C, which is a truncated pyramid, and the other is shown in FIG. 2D, as an inverted truncate pyramid having a slight downward extension 33 as noted, which imparts additional downward direction to liquids flowing through the pyramid, as will be described below. In either configuration, the pyramids are constructed of four downwardly and inwardly sloping walls 34, 36, 38 and 40. Between adjacent walls are creases as at 42. The bottoms of the walls of the pyramids define a substantially rectangular drain opening 44. Thus, any grease that falls upon the surface of the grilling surface as disclosed in 2A, will be diverted gradually downwardly on the walls 34, 36, 38 and 40, and drip through the bottom openings 44. The creases 42 provide troughs that facilitate flow through the pyramids and prevent pooling of liquefied grease in the pyramids. As best appreciated by viewing FIG. 1 and FIGS. 2A–2D, the grilling surface 20 prevents concentration of grease or drippings at any one point above the burner 26. Therefore, it prevents the rapid, unimpeded dripping of grease on the burner which can cause flare ups of the flame and the scorching or burning of food. Although referred to as drains 44 it will be appreciated that these openings also function to allow heat to rise evenly toward food placed above the device.

Figure 8:
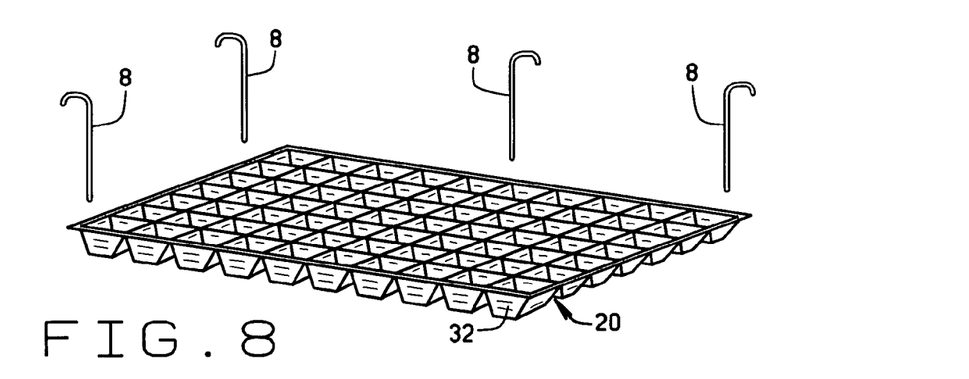
FIG. 8 shows a three-dimensional view of the flame control means for the grilling surface of this invention, further showing its suspension means for holding it in place within the gas grill.
Figure 9:
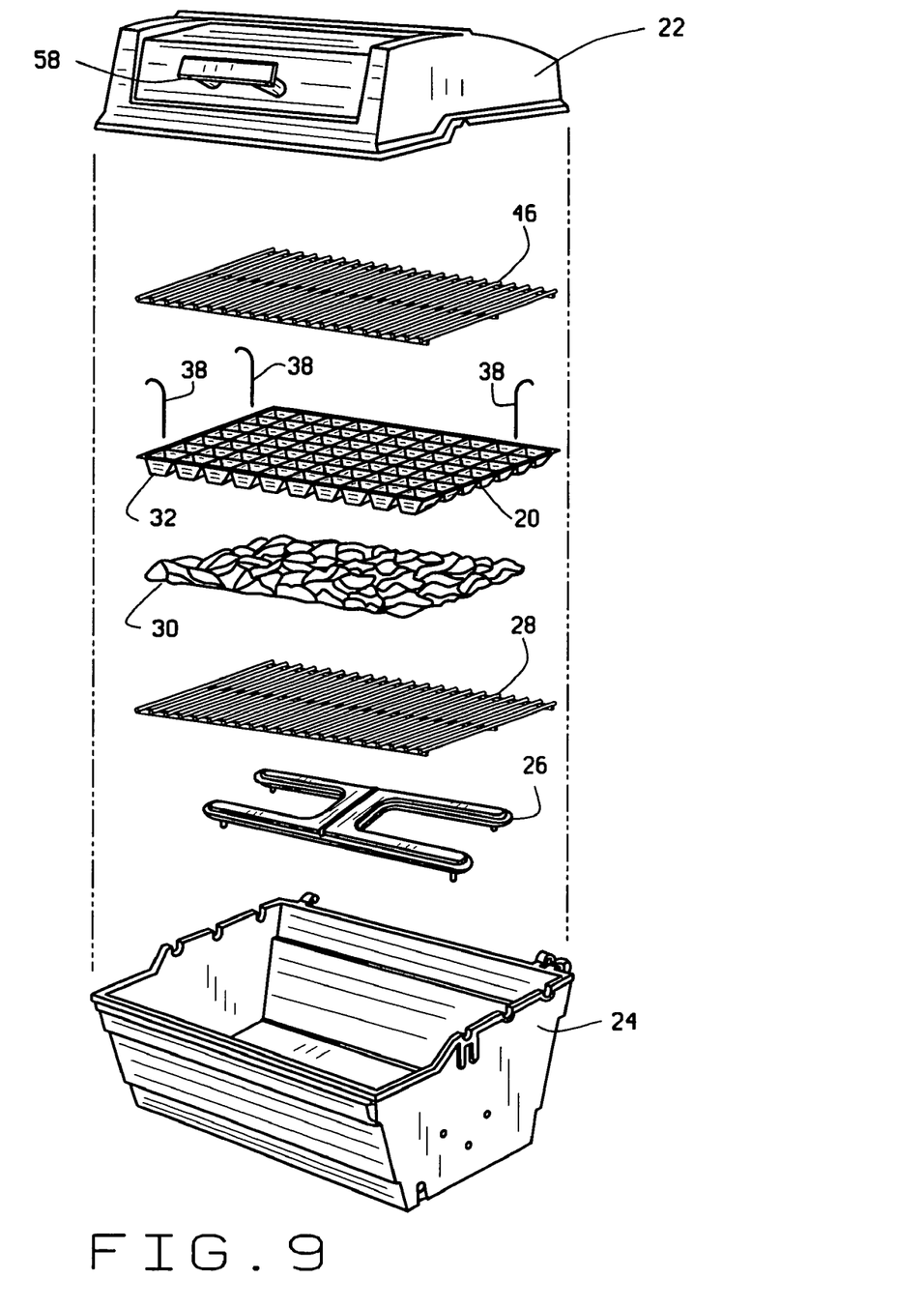
FIG. 9 shows a modification to the grilling surface control means of this invention.

A modification to the invention is shown in FIG. 9 wherein the grilling surface does not function as the direct cooking surface, but functions to disperse heat, retard burning, and to divert grease. In this particular instance, the grill includes an upper wire formed grilling rack 46 as shown as can be used in this type of grill to hold the food to be cooked. The grilling surface 20 of the present invention, shown as a slight modification in FIG. 9, is employed in this instance as a flame diffuser and grease diverter below the rack 46. The grilling surface 20 is affixed to the bottom side of the wire rack 46 by means of a series of suspension hooks 48. This modification is shown in greater detail in FIG. 8. One each of hooks 48 is position at a corner of the grilling surface 20 and appropriately suspended from rack 46. The standard lava rock or ceramic briquettes 30 or the like rest upon a lower grate 28, which, if used, are arranged slightly above the standard gas burner 26, as known. It will be appreciated that instead of having a gas burner 26, typical charcoal briquettes can be placed upon lower grate 28 and ignited to provide cooking heat. In either arrangement, the positioning of grilling surface 20 above the flames disperses any flames as well as the cooking heat more evenly. Furthermore, in this suspended position, the grilling surface 20 also functions to capture and divert grease that drips down from food placed on grill 46.

Figure 10:
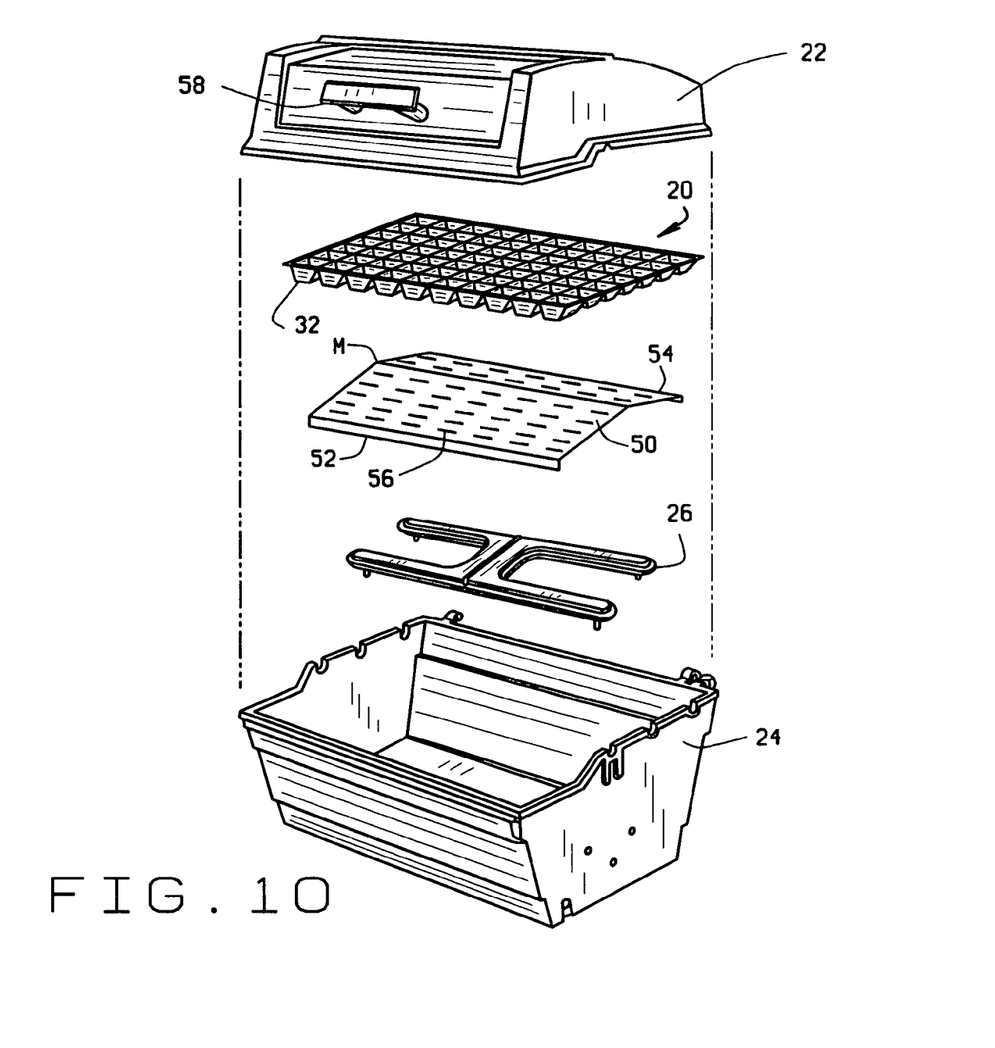
FIG. 10 shows a further modification to the control means for the grilling surface of this invention, and disclosing the grease diverter.

FIG. 10 shows a further modification of the instant invention. The grilling surface 20 of this invention is similar in construction to that as previously defined in FIGS. 2A–2D and is employed as the direct cooking surface as well as heat diffuser and grease diverter. An additional novel grease diverter 50 is positioned below grilling surface 20 and directly over the burner 26 Grease diverter 50 is a substantially flat element which is a slightly bent downward at the midpoint M to provide a first downwardly sloping panel 52 and an opposite downwardly sloping panel 54. Each panel includes a plurality of slits 56 therein, generally arranged in a series linearly aligned slits, evenly space apart, covering the entire expanse of panels 52 and 54 and through which heat is allowed to pass in an even or dispersed manner, during usage of this gas grill. Diverter 50 also provides for the further diversion of excess grease dripping from the grilling surface 20 away from the burner, so as to prevent flare up or hot spots, and toward the front and back of the base, where the liquefied grease can flow out of drain openings (not shown) in the base 24. The slits 56 do allow a small percentage of grease to contact the heat source, which can create a smoke that enhances the flavor of the cooked food.

Figure 4:
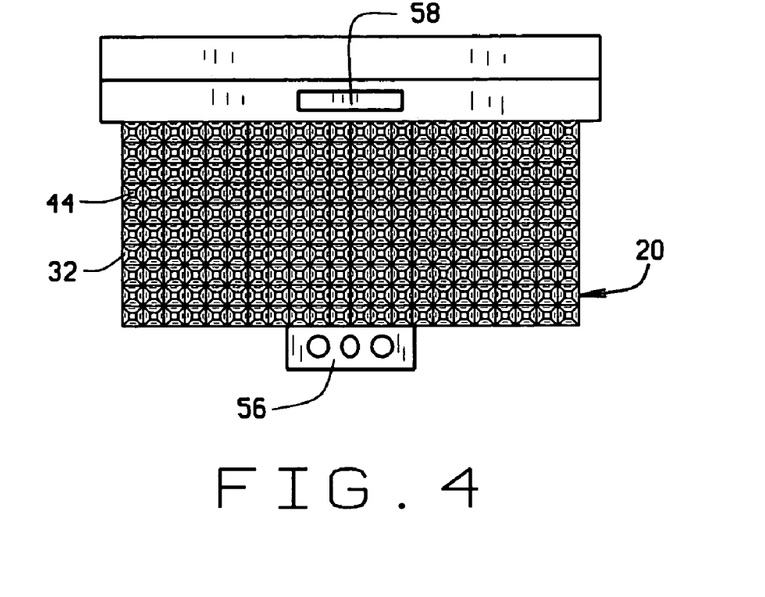
FIG. 4 is a top view of the control means for the grilling surface shown in FIG. 2A.
Figure 5:
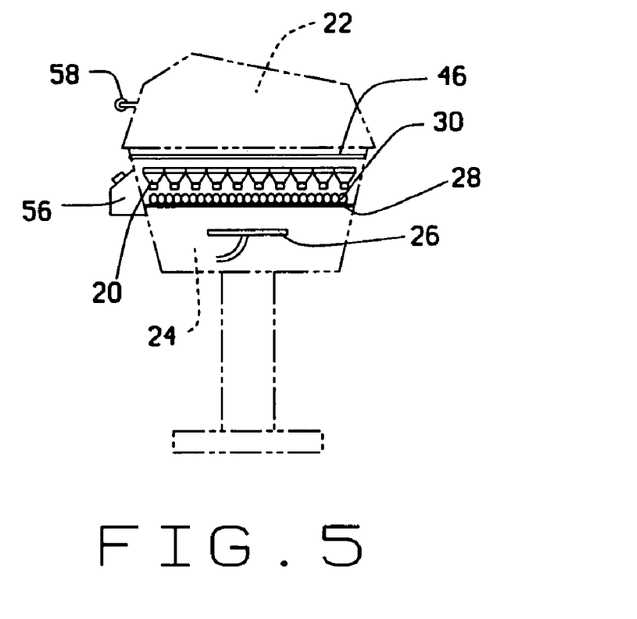
FIG. 5 is a side view showing the installation of the flame control means for the grilling surface of this invention installed within a gas fired grill.

FIG. 4 shows a top view of the grilling surface 20, as placed within a gas grill. As noted, the top view of the grilling surface 20, is very similar to that as shown previously in FIG. 2A. The grill controls are provided at 56 as well as a standard type of handle 58 as found on most gas grill lids. FIG. 5 shows a side view of the grilling surface 20 as located within the gas grill of FIG. 4 and below rack 46. As can be seen, the grilling surface 20 of this invention is designed for extending approximately from the front to the back of the base, when installed.

Figures 3A, 3B:
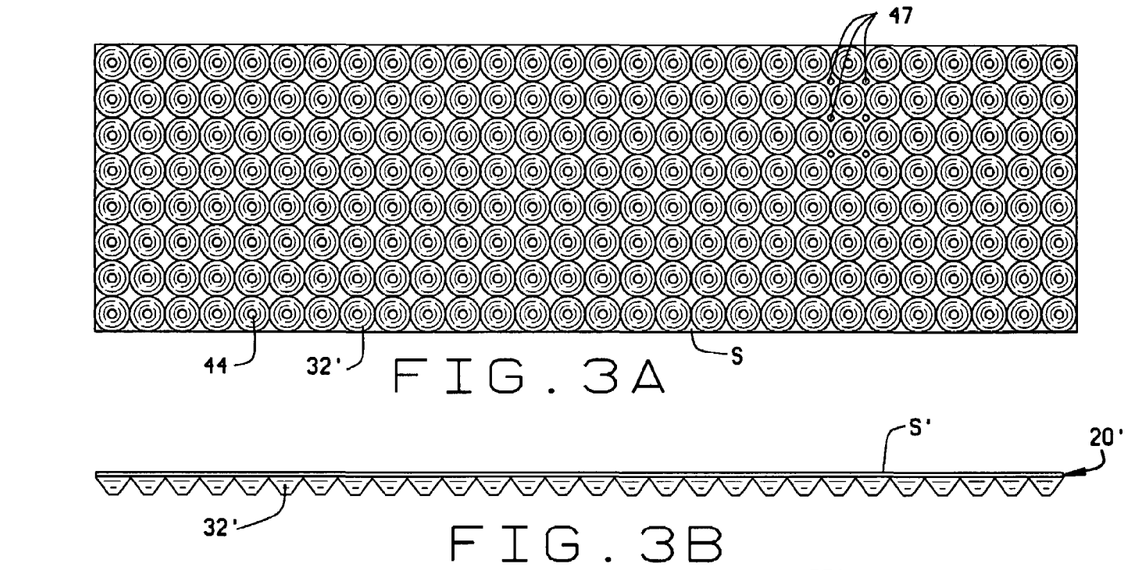
FIG. 3A provides a plan view of the funnel shaped grilling surface of this invention.
FIG. 3B provides a side view thereof.
Figure 3C:
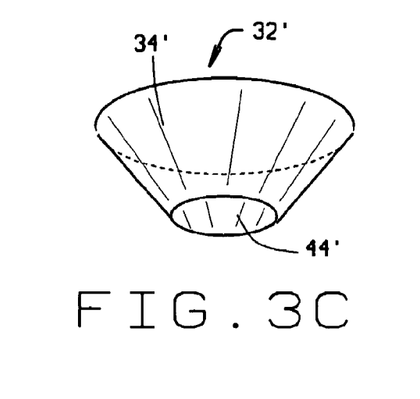
FIG. 3C provides an isometric view of the funnel shape incorporated into the grilling surface as shown in FIG. 3A.
Figure 3D:
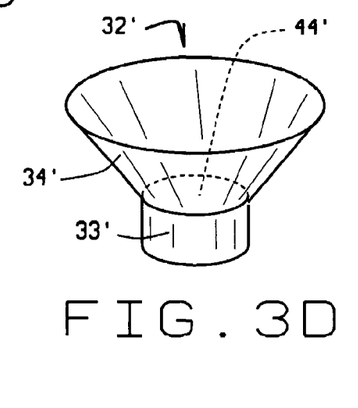
FIG. 3D provides an isometric view of a modified shaped funnel for incorporation into the grilling surface as disclosed in FIG. 3A.
Figure 6:
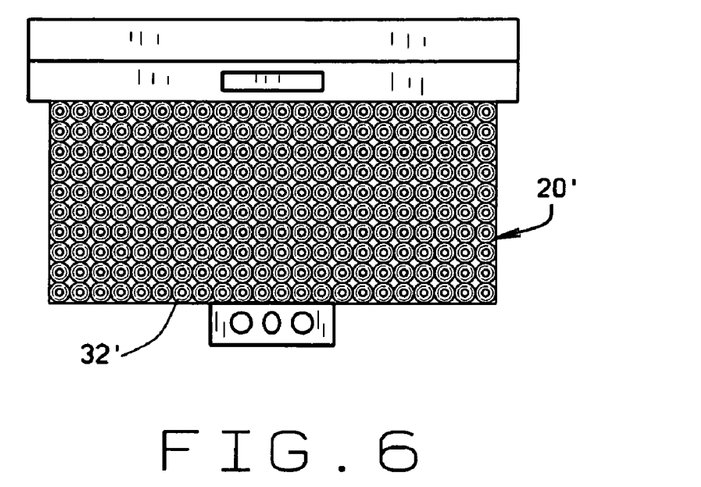
FIG. 6 is a view of the round style of plurality of funnels incorporated into the grilling surface of this invention.
Figure 7:
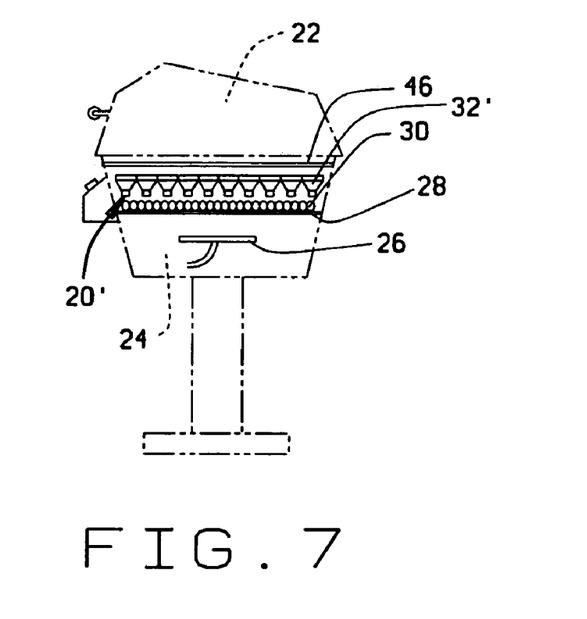
FIG. 7 is a side view of the grilling surface of FIG. 7.

FIGS. 6 and 7 disclose the use of an alternative design of a grilling surface of this invention, indicated by numeral 20'. In this instance, the grilling surface provides a series of inverted truncated cone shaped members 32', integrated together into the formation of the grilling surface. In this instance, the particular configuration and shape of the grilling surface 20' is shown in greater detail FIGS. 3A–3D. As can be noted, grilling surface 20' includes a series of integrally connected inverted truncated cones 23', whose upper edges are blended into the formation a surface S', as can be seen in 3B. Surface S may include a plurality of vent openings 47, placed among the cone shaped elements to increase air and heat flow through the device. The cone is formed from one integral wall 34' while the bottom of the cones taper downwardly, and inwardly, to terminate in drain openings 44', through which the heat rises to provide for cooking of any food that may be located upon a wire grill 46 arranged there above, such as shown in FIG. 7, or the food may be rested directly upon the upper surface of the grilling surface as shown in FIG. 3A. The drain 44 can surrounded by an extension as shown in FIG. 3D. It will be noted that grilling surface 20' may be suspended by hooks from the upper wire grill 46, as already described with regard to grilling surface 20.

Thus, as can be seen from the description of the invention as provided herein, the object of this invention is to provide a grilling surface, generally stamped from metal, and configured either as a series of integrally connected inverted and truncated pyramids, or truncated cones, as explained herein. The object is to allow for the grease to eventually drip downwardly, as the food arranged directly upon the grilling surface 20, 20' or on the wire grill 46 as used with the gas grills, becomes cooked, but at the same time, this grilling surface 20, 20' functions to allow heat to penetrate upward while it retards the direct access of any flame that may be caused when any grease falls upon the gas burner.

In operation, when used as a grilling surface 20, 20' is made in such a way that the positive open air heat transfer is at a much smaller ratio as compared to the negative non-open air heat transfer of prior art grills. The open-air transfer will allow one to have the benefits of a flame grilled product. The negative air flow will allow heat to transfer to the product for cooking, but controls the flame and reduces the possibility for grease fire flare ups.

The grease diverter 50 is a bent piece of material, as previously discussed, and has various holes or slits 56 placed at various locations through its surface. This construction allows the flame to disperse and pass through the device, to assist in a more even flame cooking of the product being cooked. In addition, while also allowing the flame or heat to pass, the device allows for a small percentage of the fat drippings to pass through the so that when heated provide some amount of flavor. In addition, when a substantial amount of the fat drippings make contact with the diverter 50, there is a dispersion or separation, with most of the grease either flowing down to the front or back edge of the diverter and away from the heat source for removal from the base of the grill.

Variations or modifications to the subject matter of this invention will occur to those skilled in the art upon reviewing the development as explained herein. Such variations or modifications, if within the spirit of this invention, are intended to be encompassed within the scope of this invention as defined and the appended claims. The description of the preferred embodiment as provided herein, for this invention, is done for illustrative purposes only.

The invention claimed is:

1. A grilling surface for a gas grill for providing flame control and grease diversion, and for placement in a cooking grill having a source of cooking heat, said surface providing for dissemination of the generated grease and to disburse heat to the food being cooked, said surface further providing control of flame-up produced by the grease drippings from any food being cooked, said surface comprising:

a plurality of interconnected hollow elements, an upper edge of each said interconnected hollow elements defining an opening into each said hollow element and a lower edge of each said hollow element defining an opening out of said hollow element, said plurality of interconnected hollow elements positioned between the food being cooked and the heat source so as to disseminate any generated grease and to spread the developed heat across the plurality of interconnected hollow elements while allowing the heat to pass through the openings of said hollow elements for access to the food being cooked, each said hollow element has an inverted pyramid configuration, each said pyramid configured hollow element comprising four inwardly depending interconnected walls, each of said four walls defining a downwardly and inwardly directed channel to a point where it interconnects with an adjacent wall, each said channel dispose to quickly move any accumulated grease within the hollow element downwardly onto the heat source, said plurality of hollow elements providing a uniform disbursal of the grease produced by the food being cooked onto the heat source, the upper edges of said plurality of interconnected hollow elements together forming a cooking surface for the placement of any food, wherein the cooking surface formed of the interconnected hollow elements forming a plurality of downward vent holes each of which disburses its accumulated grease selectively onto the heat source during cooking of any food product; and said grilling surface further including a grease diverter, said grease diverter for use beneath the said grilling surface, said grease diverter having a first rectangular panel being substantially flat and having a plurality of openings formed therein, a second rectangular panel being substantially flat and having a plurality of openings formed therein, said first and second panels angled downwardly from a mid point between said first and second panels, said downwardly angled panels positioned between the food and the grilling surface and the cooking heat source to disseminate a substantial quantity of grease produced by the food evenly into heat away from the heat source.

2. The grilling surface of claim 1 and further comprising suspension elements at each corner of the cooking surface for suspending the surface below the grilling surface.

3. The grilling surface of claim 1 wherein said plurality of openings formed in each said panel further comprise a plurality of linearly aligned slots formed in each panel.

4. The grilling surface of claim 3 wherein said grease diverter is formed from stamped metal.

5. A grilling surface for a gas grill for providing flame control and grease diversion, and for placement in a cooking grill having a source of cooking heat, said surface providing for dissemination of the generated grease and to disburse heat to the food being cooked, said surface further providing control of flame-up produced by the grease drippings from any food being cooked, said surface comprising:

a plurality of interconnected hollow elements, an upper edge of each said interconnected hollow elements defining an opening into each said hollow element and a lower edge of each said hollow element defining an opening out of said hollow element, said plurality of interconnected hollow elements positioned between the food being cooked and the heat source so as to disseminate any generated grease and to spread the developed heat across the plurality of interconnected hollow elements while allowing the heat to pass through the openings of said hollow elements for access to the food being cooked, each said hollow element has an inverted conical configuration, each said conical configured hollow element comprising a depending inwardly tapering wall each of said wall defining a downwardly and inwardly directed channel to a point where it forms a downwardly opening, each said channel disposed to quickly move any accumulated grease within the hollow element and downwardly onto the heat source, said plurality of hollow elements providing a uniform disbursal of the grease produced by the food being cooked onto the heat source, the upper edge of said hollow elements together forming a cooking surface for the placement of any food, wherein the cooking surface formed of the interconnected hollow elements forming a plurality of downward vent holes each of which disburses its accumulated grease selectively onto the heat source during cooking of any food product; and said grilling surface further comprising suspension elements at each corner of the grilling surface for suspending the surface below the cooking grill.

* * * * *